United States Patent [19]

Bucher, II

[11] Patent Number: 4,683,529

[45] Date of Patent: Jul. 28, 1987

[54] SWITCHING POWER SUPPLY WITH AUTOMATIC POWER FACTOR CORRECTION

[75] Inventor: James D. Bucher, II, St. Paul, Minn.

[73] Assignee: Zytec Corporation, Eden Prairie, Minn.

[21] Appl. No.: 929,603

[22] Filed: Nov. 12, 1986

[51] Int. Cl.$^4$ ...................... H02M 7/217; H02M 1/12
[52] U.S. Cl. .................................. 363/44; 323/207; 323/222; 363/82; 363/89; 363/126
[58] Field of Search .................... 363/44, 45, 82, 89, 363/90, 126, 21, 37, 80; 323/222, 207, 282, 299, 300, 287, 288; 315/208, 243

[56] References Cited

U.S. PATENT DOCUMENTS

| | | | |
|---|---|---|---|
| 3,530,370 | 9/1970 | Yamachi et al. | |
| 3,913,002 | 10/1975 | Steigerwald et al. | 315/208 |
| 4,193,111 | 3/1980 | Wester | 363/84 |
| 4,317,076 | 2/1982 | Price | 323/210 |
| 4,339,705 | 7/1982 | Kelley | 323/210 |
| 4,356,440 | 10/1982 | Curtiss et al. | 323/210 |
| 4,533,986 | 8/1985 | Jones | 323/222 |
| 4,553,082 | 11/1985 | Nesler | 323/288 |

OTHER PUBLICATIONS

Radcliffe, "Control Circuit for Switching Regulator", IBM Tech. Discl. Bul., vol. 25, No. 11B, pp. 6098–6100, Apr. 1983.
Marple, "Low Distortion Three Phase Power Regulator", IBM Tech. Discl. Bul., vol. 22, No. 3, pp. 970, 971, Aug. 1979.
"A Simple but Accurate Analysis of Capacitor Input Rectifier Circuits", by J. H. Hendriks; *Powerconversion International*, Jul. 1985, pp. 32, 37–38.
"Dynamic Power Factor Correction in Capacitor Input Off Line Converters", by D. Chambers and D. Wang, Proceedings of Powercon 6.
"Sinusoidal Line Current Rectification with a 100 kHz B-Sit Step-Up Converter", by N. Mohan, T. Undeland and R. Ferraro, IEEE, 1984, pp. 92–98.
"Novel Topological Alternatives to the Design of a Harmonic-Free, Utility/DC Interface", by M. Schlecht, IEEE, 1983, pp. 206–216.
"An AC to DC Converter with High Quality Input Waveforms", by M. Kocher and R. Steigerwald, IEEE, 1982, pp. 63–75.
"A Line Interfaced Inverter with Active Control of the Output Current Waveform", by M. Schlecht, IEEE, 1980, pp. 234–241.

*Primary Examiner*—William M. Beha, Jr.
*Attorney, Agent, or Firm*—Merchant, Gould, Smith, Edell, Welter & Schmidt

[57] ABSTRACT

An off-line switching power supply is described which controls the switching transistor of a fly-back circuit in such a fashion as to achieve better than 0.99 power factor control. The technique used for power factor control allows the switching power supply to operate either from AC or DC sources. The power supply operating from an AC source will accept all international voltages and line frequencies as input to produce a well-regulated DC output. The inductor of the fly-back circuit is maintained at the verge of continuous/discontinuous operation by the power factor control circuit to achieve a high efficiency operation and to minimize switching losses. The power factor correction circuit uses pulsewidth modulation and frequency modulation to control the switching transistor and maintain a high power factor under varying line and load conditions. The power supply also includes integral current limiting protection and RFI filtering for safe and quiet operation.

11 Claims, 9 Drawing Figures

SWITCHING POWER SUPPLY WITH AUTOMATIC POWER FACTOR CORRECTION

BACKGROUND OF THE INVENTION

The present invention relates to circuits for achieving close to unity power factor for electrical loads and more particularly to dynamic power factor control and correction for switching power supplies.

"Power factor" is defined as the ratio of the input power in watts (actual power) over the power ($V_{rms} \times I_{rms}$) measured with an rms voltmeter and ammeter (apparent power). The traditional concept of phase angle between the voltage and current waveforms used to define power factor is not applicable to switching power supplies for off-line converters because the input current is drawn in short pulses of high peak value such that the current waveform is not sinusoidal. Therefore, traditional methods of improving power factor with passive components such as inductors and capacitors do not work with switching power supplies or off-line converters because the current is drawn in the form of narrow pulses having high peak values. To achieve a high power factor in switching power supplies, the line current is chopped at a relatively high frequency and fed to a fly-back type of circuit. The amount of current that is allowed to feed the fly-back circuit is electronically controlled such that the average current forms a sinusoidal waveform of a proportional magnitude and identical phase as the line voltage.

Various forms of power factor correction for off-line switching power supplies have been proposed in the prior art. These prior art devices switch the current through the fly-back transformer or inductor while the inductor is charged. This dynamic switching of inductor current results in switching losses and heating of the various components. Some of these devices use a feedback sense signal from the incoming line to attempt to match the switching of the inductor current to the sinusoidal line voltage when then limits the operation of the circuit to AC input only. Some of these circuits also are limited as to their voltage operation and frequency of operation range, forcing design changes to adapt the unit to various international standards for units shipped overseas. The efficiency of operation of these prior art switching power supplies is limited by the fact that a fixed chopping frequency is used at all points along the sinusoidal line voltage curve.

The present invention is designed to obtain a high power factor in the range of greater than 99% by controlling the current through the fly-back circuit and shaping the current demand of the circuit to match the sinusoidal waveform of the input line voltage. The circuit is designed to operate from a wide range of line voltages and frequencies and includes integral current limiting and voltage sensing to produce a highly stable output voltage at high current demands. Thus, the present invention overcomes many of the drawbacks of the prior art in an efficient and cost-effective manner.

SUMMARY OF THE INVENTION

The present invention discloses a power factor control circuit for use in switching power supplies which automatically controls the amount of current drawn from the power line such that the average current drawn is in phase and proportional to the voltage on the power line. This circuit uses the fly-back technique to alternately charge and discharge current in an inductor in such a fashion to insure a high power factor under changing line and load conditions. The control circuit varies the chopping frequency of the charging and discharging control transistor in a range between 25 kHz and 500 kHz. The duty cycle of the chopping signal is also varied according to the line and load conditions of the circuit. The duty cycle also varies according to the ability of the inductor to draw current from the line at different locations on the sinusoidal waveform of the input line voltage. The foregoing variations in chopping frequency and duty cycle allow the present switching power supply to very closely match the average current drawn from the line to the line voltage in both phase and magnitude.

The present invention also achieves its high power factor by maintaining the inductor at the verge of continuous/discontinuous operation by always allowing the inductor to fully discharge the stored current before attempting to recharge the inductor with line current. By switching the inductor at zero current through the inductor, switching losses are reduced and a high degree of efficiency is obtained along with the high power factor.

The power factor correction control circuit monitors the current through the inductor via a reset detect circuit and the filtered voltage on the output of the power supply to calculate the frequency and duty cycle of the control signal of the chopping transistor. This allows the power supply to operate at a wide range of line voltages and frequencies to obtain a well regulated and filtered DC voltage on the output. The line frequency may vary from DC to 4,000 Hz while the AC line voltage may vary from 80 volts to 268 volts and the DC line voltage may vary from 60 volts to 380 volts. This wide range of operating frequencies and voltages allow for adaptation to international variations in voltage and frequency without adapting the power supply to the local power standards. The power factor of the present invention remains close to unity for the wide variation in frequency and voltage for the local standards.

In addition to the foregoing, the present invention incorporates integral current limiting, undervoltage hold-off protection, and no-load control to ensure safe operation of the present invention. The foregoing features of the present invention are integrally incorporated into the design such that the power factor correction control circuit automatically varies the chopping frequency and duty cycle to compensate for these changing conditions.

These and other objects and advantages of the present invention will become apparent to those skilled in the art upon reading and understanding the detailed description below.

BRIEF DESCRIPTION OF THE DRAWINGS

In the drawings, where like numerals refer to the same components.

DETAILED DESCRIPTION OF THE PREFERRED EMBODIMENT

Figure 1:
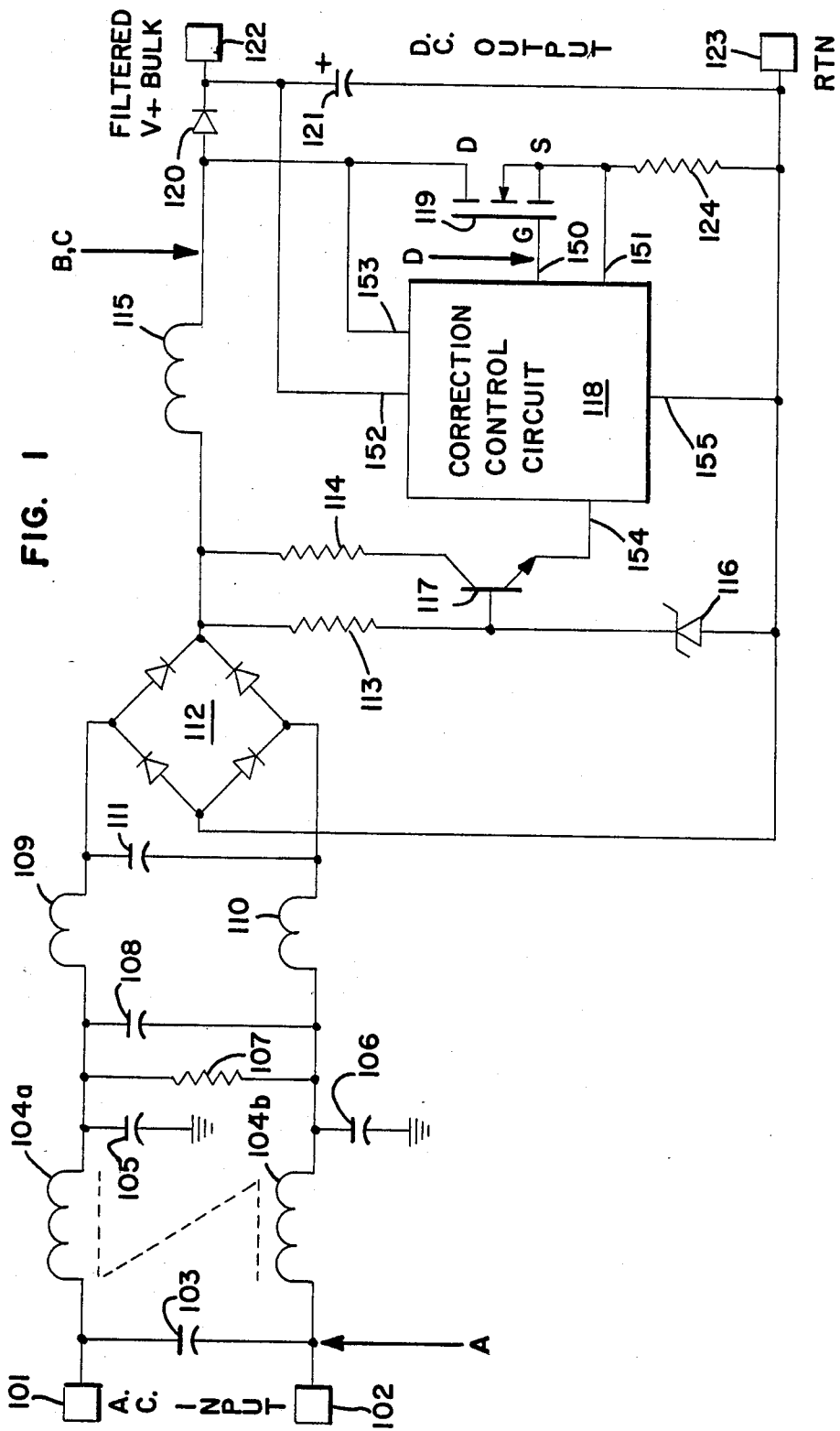
FIG. 1 is a schematic diagram of a typical switching power supply which incorporates the present invention.

A typical off-line switching power supply is shown in FIG. 1. The present invention is embodied in the box labeled Correction Control Circuit 118 and serves to control the switching of the current through inductor 115 by means of FET transistor 119.

The front end of this power supply includes several devices which are not essential to the operation of the present invention. These devices are shown for illustrative purposes, since they are typically found in switching power supplies. The AC input to the power supply on lines 101 and 102 are separated from AC-to-DC rectifier bridge 112 by a series of components designed to filter high-frequency noise from the AC input line. Various FCC requirements and noise regulations must be adhered to in switching power supplies to limit the amount of switching noise which finds its way onto AC lines. The front end of this power supply therefore comprises a filter which consists of a line-to-line capacitor 103, a common mode inductor comprised of coils 104A and 104B, and line-to-chassis capacitors 105 and 106. Additional line-to-line capacitors 108 and 111 are Agency-approved AC line capacitors ranging in value from 3 uf to 8 uf. These capacitors are used to impede high-frequency ripple from showing up on the AC line. Inductors 109 and 110 also serve to limit in-rush currents upon initial power-up to prevent peak currents from causing nuisance breaker trips.

The AC input power is rectified through bridge rectifier 112 and supplied to the switching power supply circuit to the right, as shown in FIG. 1. Transistor 117 biased by resistor 113 and zener diode 116 is designed to provide an initial start-up bias from the full wave rectified AC line, which allows AC or DC operation of the power supply. Therefore, input lines 101 and 102 are designed to allow DC line voltages to drive the switching power supply as shown in FIG. 1. In the subsequent schematic diagrams, the bias supply and voltage distribution is assumed and is not described. It is well within the skill of those practicing in the art of switching power supplies to easily create a 10 V-to-ground biased supply voltage circuit to drive the correction control circuit 118.

Switching FET transistor 119 and inductor 115 form the high-frequency boost converter. Energy stored in inductor 115 is discharged through diode 120 to the load attached to the DC output on lines 122 and 123. Storage capacitor 121 is a large electrolytic bulk storage capacitor used to filter and store the DC output voltage. The voltage on capacitor 121 is regulated at 390 V DC to provide a standard DC voltage on the output for any and all international input line ranges and frequencies found throughout the world. According to the present invention more fully described later in this specification, the present power supply described in FIG. 1 will produce a regulated 390 V DC output for input voltages ranging from 80 V to 268 V AC at a frequency between DC and 4 kHz.

Correction control circuit 118 receives feedback signals through the various lines shown in FIG. 1. Line 152 receives a voltage sense signal from bulk capacitor 121 connected to DC output 122. Feedback line 153 in conjunction with line 152 senses whether diode 120 is forward biased and passing current from inductor 115 to storage capacitor 121. Line 155 is attached to DC return line 123 which also serves as the common or ground conductor for the DC bias supply which serves to power the integrated circuits and discrete components of correction control circuit 118. Feedback line 151 in conjunction with return line 155 serves to sense current through FET transistor 119 by sensing the voltage drop across resistor 124. Line 154 serves to provide a start-up bias current for the bias supply.

Line 150 is the clock or FET drive control line which drives the gate of n-type MOSFET transistor 119. The drain of FET transistor 119 is attached to inductor 115 and the anode of diode 120. The source of FET transistor 119 is connected to current sensing line 151 and voltage drop resistor 124. The purpose of FET transistor 119 is to alternately open and short inductor 115 to the ground or return line 123. It will be appreciated by those skilled in the art that bipolar transistors are sometimes used as a substitute for FET 119. Other semiconductor switches could also be used such as SCR's or Triacs.

When FET transistor is ON, inductor 115 is effectively connected across diode bridge 112 and is charged with current. FET transistor 119 in this condition is energized by a positive-going clock signal on gate line 150. When FET transistor 119 is OFF, inductor 115 is effectively open circuited from the return line 123 and is allowed to dump its stored energy through diode 120 and into the load connected between lines 122 and 123 on the DC output. This technique is well known in the switching power supply art, since it is a maxim that the open circuiting of an inductor which has a charged magnetic field causes the inductor to attempt to collapse its magnetic field in the shortest time possible, which then results in a high output voltage on the terminals of the inductor. This technique, commonly referred to as a fly-back technique, is used in switching power supplies to boost a voltage up to a higher value by alternately charging and open circuiting an inductor.

The heart of the present invention is therefore contained in the correction control circuit 118, which effectively senses various currents and voltages operating within the switching power supply shown in FIG. 1 to produce a clock or FET drive signal on line 150 to control the switching of inductor 115 by means of FET transistor 119. The amount and duration of switching of FET transistor 119 varies according to the amount of load on the DC output, the amount of charge in capacitor 121, the amount of current through FET transistor 119, and the inductor current passing through forward-biased diode 120. Note that correction control circuit 118 does not sense the incoming AC line voltage as applied to terminals 101 and 102. Rather, the present invention senses the result of the incoming line voltage as it passes through inductor 115 in terms of current. The result is that the current drawn through inductor 115 is then proportioned to the magnitude of the voltage applied on the AC input and is in phase with that voltage, resulting in a high power factor approaching unity.

A 1.00 power factor is theoretically possible with the present invention assuming ideal components. However, due to the time delay through various integrated circuits contained in correction control circuit 118 and inherent losses of various discrete components, a perfect unity power factor is unachievable. The present invention is capable of achieving better than 0.99 power factor with the components listed herein. It should be noted, however, that due to the FCC requirements restricting the amount of noise emanating onto the AC line from switching power supplies, the RFI filter input previously described and shown in FIG. 1 results in a small shift in the phase between the current and voltage waveforms received from the AC input lines 101 and 102. This is due to the slight amount of capacitive and inductive loading inherent in the filter design. This further reduces the overall power factor of the switching power supply shown in FIG. 1, but the power factor in real applications is still higher than 0.98 in moderate to heavy loading. No-load conditions on the present power supply result in a further phase shift between the current and voltage waveforms due to the larger losses of the front-end RFI filter in comparison with the losses in the unloaded switching power supply and correction control circuit. This is of little consequence, however, since an unloaded power supply draws very little power.

Figure 2:
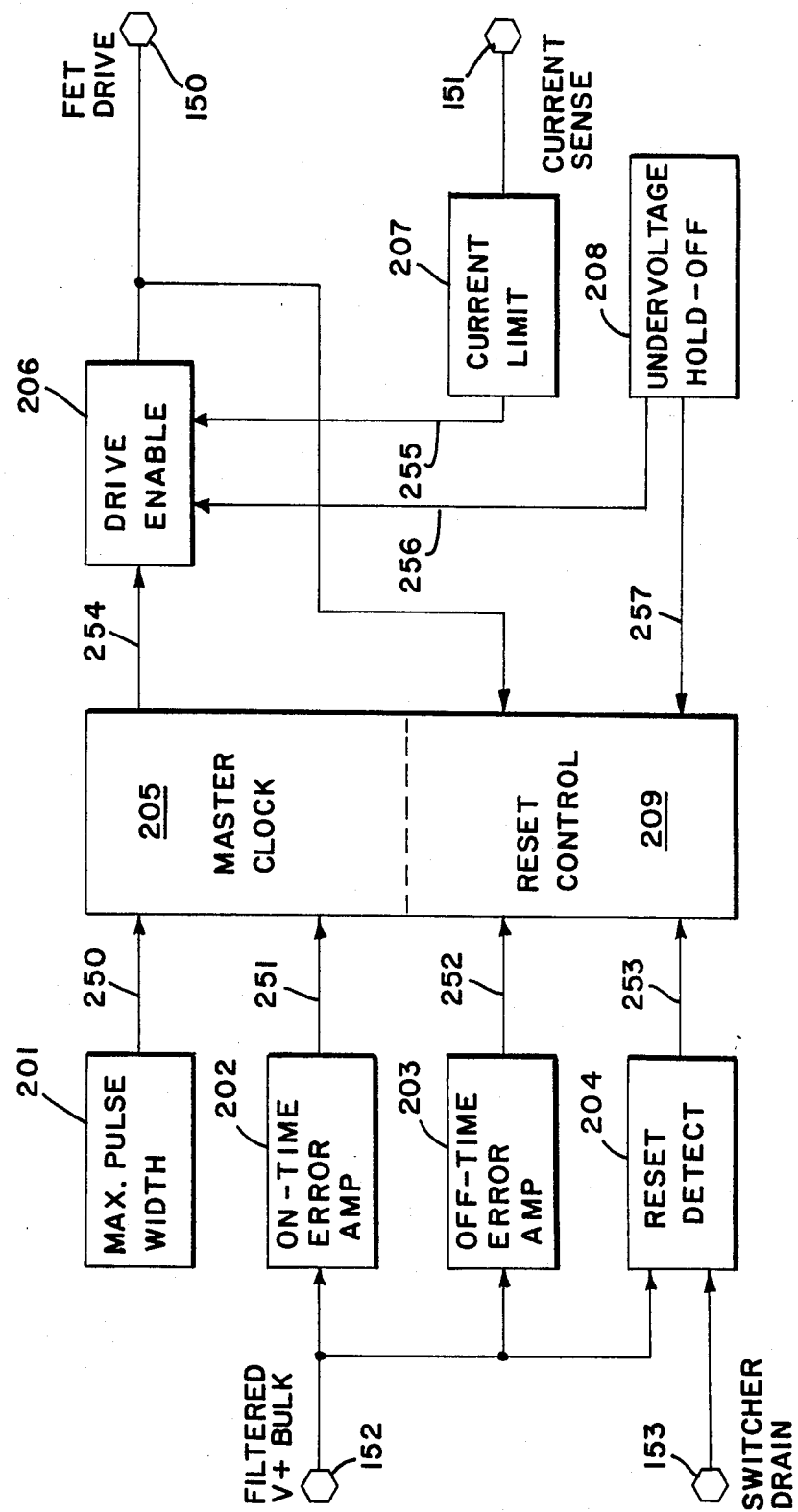
FIG. 2 is a block diagram of the power factor correction control circuit which is the object of the present invention.

FIG. 2 shows a block diagram of the correction control circuit 118 found in FIG. 1. Lines 154 and 155 which correspond to the bias voltage supply and ground respectively are not shown in FIG. 2, since these are not necessary for the understanding and operation of the present invention. Line 152 represents the filtered V+ bulk sense wire attached to the cathode of diode 120 and electrolytic capacitor 121. This line provides a voltage feedback sense signal to the power factor correction control circuit which attempts to maintain the voltage on line 152 at approximately 390 V DC.

On-time error amplifier 202 serves to sense when the voltage on line 152 is less than 390 V DC. Ontime error amp 202 produces a linear low voltage signal on line 251 in proportion to the amount of voltage found on line 152 that is less than 380 V DC. The linear voltage signal on line 251 ranges from zero volts DC, indicating a voltage on line 152 below the threshold (approximately 380 V DC) of amplifier 202 up to 4.0 V DC, which indicates 390 V DC. When the voltage on line 152 ranges between 380 V DC and 400 V DC, the output of on-time error amp 202 will range between 4.0 V DC and 7.3 V DC. The amplifier in this range of operation produces a non-linear error signal as part of a closed loop feedback system. This error signal serves to closely regulate the output voltage on the output of the switching power supply to approximately 390 V DC, but the actual voltage may range from 380–400 V DC. The upper range of output voltage from on-time amplifier 202 is clamped at 7.3 V DC and does not exceed that value, even though the voltage on line 152 may exceed 400 V DC.

Off-time error amplifier 203 serves to indicate when the voltage on line 152 exceeds 390 V DC. Offtime error amplifier 203 is identical to on-time error amplifier 202 in design and gain, except that its operating range is selected by a different voltage divider network to sense voltages in the range of 390 V DC to 410 V DC. The signal on line 252 is a linear voltage in proportion to the voltage on line 152 from zero to 390 V DC. The voltage on line 252 runs a range from zero to 4.0 V DC in proportion to the voltage on line 152 that ranges from zero V DC up to approximately 390 V DC. Between 390 V DC and 410 V DC, the signal on line 252 ranges between 4.0 V DC and 7.3 V DC in a nonlinear error signal as part of a closed loop feedback system.

Reset detect circuit 204 serves to detect when the current through inductor 115 is zero. Reset detect circuit 204 accomplishes this function by sensing the voltage across diode 120 which has its anode connected to line 153 and its cathode connected to line 152. Line 153 is also connected to the drain of switching transistor 119. Reset detect circuit 204 senses when the current through inductor 115 has fallen below a level sufficient to make the voltage necessary to forward bias diode 120 and supply current to the load attached to DC output terminals 122 and 123. The reset detect circuit 204 produces a digital signal on line 253 indicating when inductor 115 has "reset" and no longer supplies current to the output of the power supply.

Master clock circuit 205 and reset control circuit 209 serve to generate a clocking signal on line 254 which effectively controls FET 119. Master clock circuit 205 and reset control circuit 209 function together to vary the frequency and duty cycle of the clocking signal on line 254 to effectively generate a drive signal for FET 119 which will result in a power factor approaching unity. The clocking signal on line 254 is also affected by varying conditions on the load and line which are also sensed by the reset control circuit 204. For example, current limit circuit 207 senses the current on line 151 through resistor 124. This circuit serves to determine the amount of current through inductor 115 by sensing the current through the source terminal of FET transistor 119. When the current through sense resistor 124 exceeds a preset threshold, an inhibit signal is produced on line 255 which is used to disable the drive signal for FET transistor 119.

Under voltage holdoff circuit 208 also produces an inhibit signal on line 256 if the bias supply for the power factor correction control circuit is below the minimum threshold necessary for operation of the circuit. This condition is typically found when the power supply is initially powered up and insufficient time has been allowed to charge the bias supplies. Line 257 also supplies a signal to the reset control circuit 209 to indicate this condition. The operation and details of the circuit as shown in the block diagram of FIG. 2 are described along with the timing diagrams in the remaining portions of this disclosure.

Figure 3:
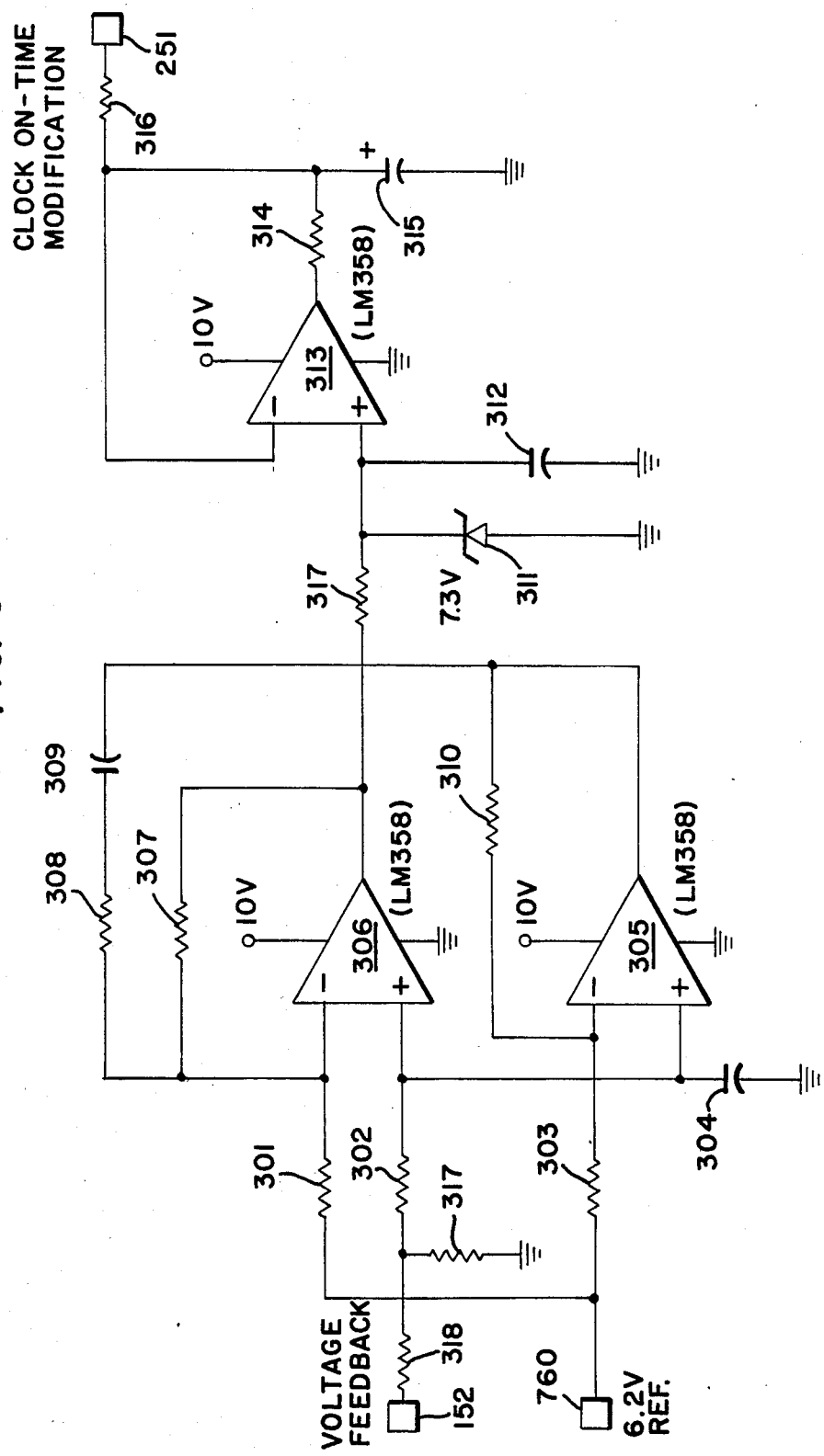
FIG. 3 is an electrical schematic diagram of the clock on-time modification circuit.

FIG. 3 shows the clock on-time modification amplifier in detail. The voltage feedback signal on line 152 is received from the cathode of diode 120 and the bulk electrolytic capacitor 121 connected across the DC output of the present power supply. The 6.2 V reference signal 760 is generated by means of a 6.2 V zener diode shown in FIG. 7. The voltage feedback signal is divided down between resistor-divider network 318 and 317. The signal is then received through resistor 302 on the noninverting input of operational amplifier 306. Operational amplifiers 306, 305 and 313 are LM358 low-power dual operational amplifiers manufactured by National Semiconductor. These operational amplifiers are commonly available off-the-shelf devices manufactured by a number of vendors. It will be appreciated by those skilled in the art that a wide variety of operational amplifiers may be substituted therefor without deviating from the scope of the present invention.

The 6.2 V reference signal is applied to the inverting input of operational amplifier 306 through resistor 301. This fixed reference source is compared to the divided-down feedback voltage of bulk capacitor 121. This divided-down error voltage is applied to the noninverting input of operational amplifier 306 through series resistor 302. The output voltage of amplifier 306 will be proportional to the difference between the noninverting and inverting inputs, with a gain factor of 10. When the output voltage of amplifier 306 reaches a 4.0 V level the output of amplifier 306 will no longer be a proportional voltage to the input error signal. This is due to being a closed loop system. At the 4.0 V threshold the amplifier 313 will start to source current through resistor 316 to modify the charge rate of the timing capacitor 712. With a 3.3 V change on the output of amplifier 313, the master clock (FIG. 7) will alter the ON period 90 to 1. An alteration of 90 to 1 on the charge rate of inductor 115 will cause an effective energy difference of 8100 to 1. A 4.0 V to 7.3 V output on amplifier 306 now monitors energy proportional to error voltage with a gain factor of 8100 instead of a direct voltage feedback ratio from bulk capacitor 121.

Operational amplifier 305 receives the same voltage feedback signal from line 152 on its noninverting input. The inverting input of operational amplifier 305 also receives the 6.2 V reference signal through diode 303. The gain of operational amplifier 305 is selected between resistors 310 and 303 to be 10. The output of operational amplifier 305 is fed through bypass capacitor 309 and limiting resistor 308 into the summing point at the inverting input of operational amplifier 306. This configuration of feeding the same signal derived from the voltage feedback line 152 into the inverting input of operational amplifier 306 serves as a ripple rejection circuit effectively cancelling the small ripple found on the output of the switching power supply. The present configuration provides that while operational amplifier 306 has a gain of 10, it also achieves through the use of negative feedback a ripple rejection of 20.

The output of operational amplifier 306 is driven through limiting resistor 317 and connected to zener diode 311 which serves as a 7.3 V upper-limit clamp. Capacitor 312 serves to absorb any high-frequency transience. Operational amplifier 313 serves as a unity gain output buffer to provide additional drive and current capacity to output line 251. Tantalum capacitor 315 serves as an energy reservoir for fast charging of timing capacitor 712 through transistor 703.

Figure 4:
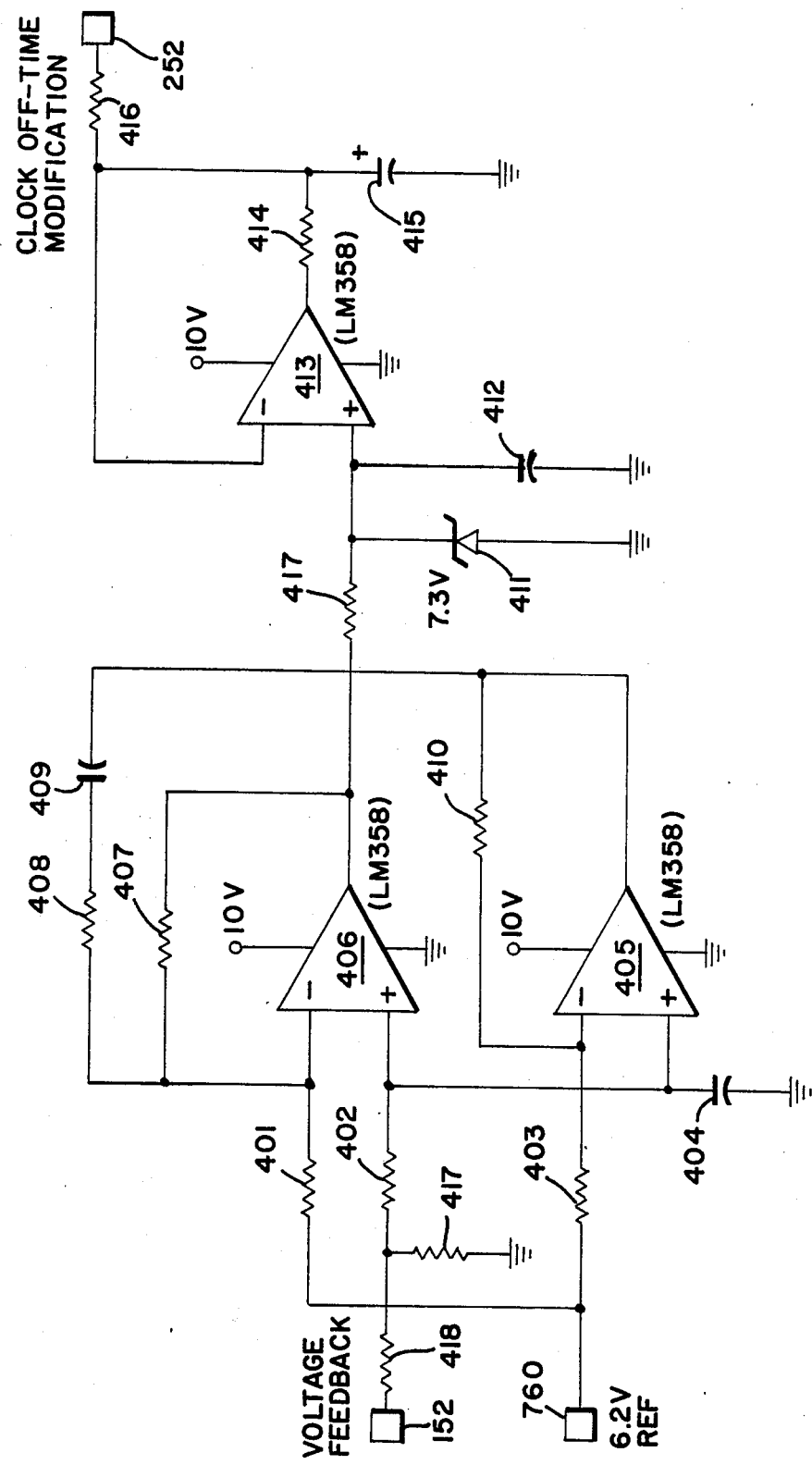
FIG. 4 is an electrical schematic diagram of the clock off-time modification circuit.

FIG. 4 shows the clock off-time modification amplifier. This circuit is identical to the on-time modification amplifier shown in FIG. 3, and will not be described here in detail. The two circuits operate identically except for a different operating threshold due to the selection of resistor values for the voltage divider comprised of resistors 418 and 417. The offtime modification amplifier produces a feedback error signal output in response to the voltage feedback signal on line 152.

The output of the clock on-time modification amplifier ranges from 4 V to 7.3 V DC in a closed loop feedback system in a nonlinear relationship to voltage variations on the DC output line 152 between approximately 380 V DC and 400 V DC on the voltage feedback line 152. When the voltage on feedback line 152 reaches 400 V DC, the output of the on-time amplifier shown in FIG. 3 is pegged at 7.3 V. As the voltage on voltage feedback line 152 exceeds 400 V DC, the output of the on-time modification amplifier remains at 7.3 V DC.

The operating range of clock off-time modification amplifier shown in FIG. 4 ranges from approximately 390 V DC to 410 V DC. The output of the clock off-time modification amplifier remains at zero volts DC anytime the voltage feedback line 152 is at 390 V DC or less. As the voltage on line 152 exceeds 390 V DC, the output of the off-time modification amplifier rises in response to the voltage on line 152. The off-time modification amplifier is also limited by zener diode 411 to 7.3 V such that when the feedback voltage on line 152 exceeds 410 V DC the output of off-time modification amplifier stays pegged at 7.3 V DC. These two amplifiers serve to provide error feedback signals in response to the voltage on bulk capacitor 121. These signals are used, as is later described, to change the timing cycles of the master clock to correct over-voltage and undervoltage conditions on the output of the switching power supply.

Figure 5:
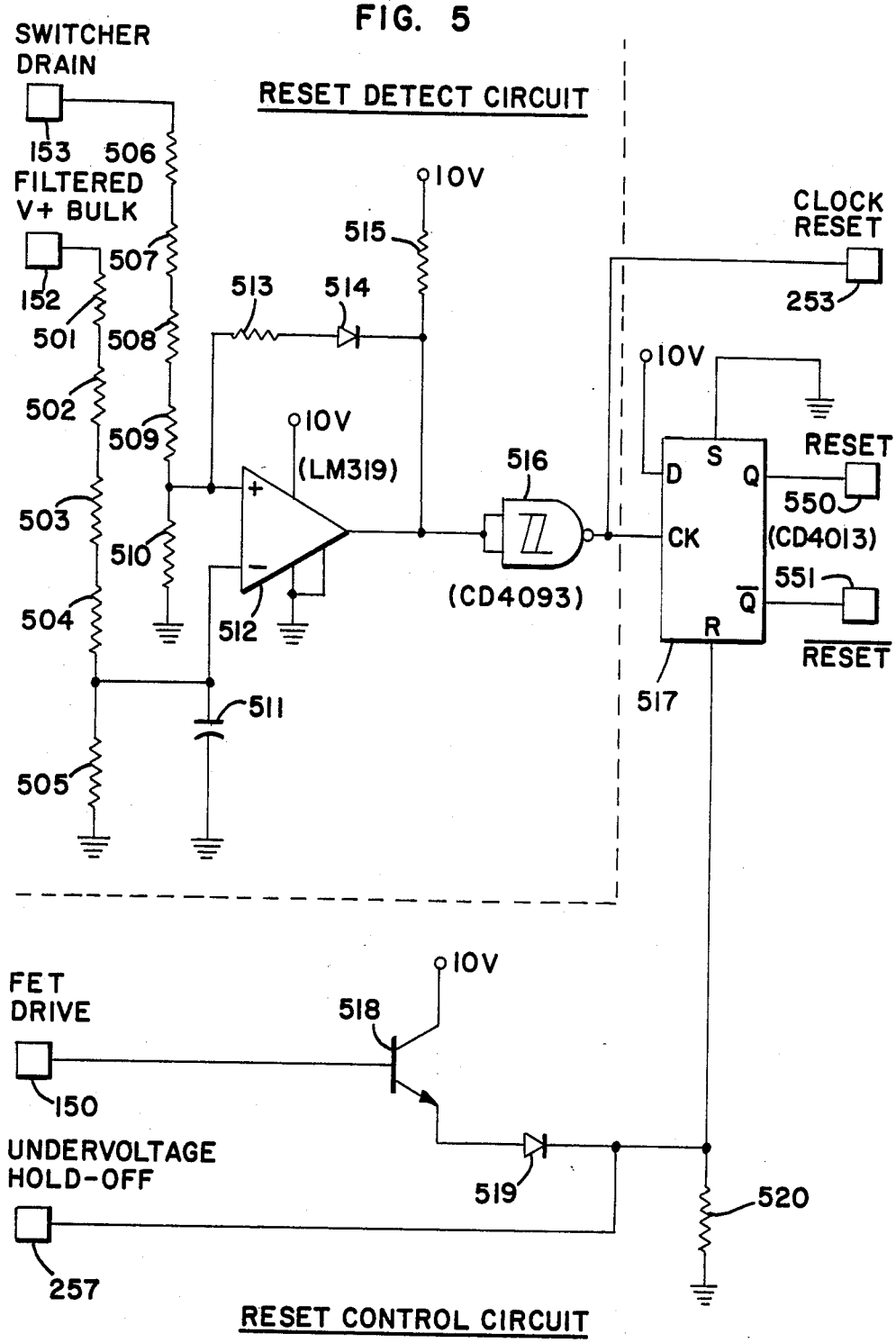
FIG. 5 is an electrical schematic diagram showing the reset detect circuit and a portion of the reset control circuit.

FIG. 5 shows the reset detect circuit and a portion of the reset control circuit. The switcher drain line 153 corresponds to the connection to the anode of diode 120 while filtered V+ bulk line 152 corresponds to the cathode of diode 120. The function of the reset detect circuit is to detect when the rectifier diode 120 is no longer forward-biased, indicating zero current through inductor 115. Resistors 501 through 510 provide high voltage divider ladders to step the sensed voltages down to levels that can be safely handled by comparator 512. Comparator 512 is, in the preferred embodiment, an LM319 high-speed dual comparator available from National Semiconductor. This type of comparator is an off-the-shelf device commonly available from a wide variety of vendors. Those skilled in the art will readily recognize that other types of comparators may be substituted therefor without deviating from the scope or spirit of the present invention.

The use of multiple resistors wired in series such as resistors 501-504 and 506-509 is designed to allow for high heat dissipation while maintaining the close tolerance necessary for detecting slight voltage variations. Resistor 513 and diode 514 are used as positive feedback (hysteresis) to cause a faster switching. Pull-up resistor 515 is used to square up the output of comparator 512.

When rectifier diode 120 is forward-biased, a positive DC voltage will be found on the output of comparator 512. When diode 120 is no longer forwardbiased, the output of comparator 512 will fall to approximately zero volts DC, indicating that the inductor has reset and no current is flowing through rectifier diode 120. Thus, the falling edge of the digital signal produced by comparator 512 indicates the reset function. This signal is used to drive Schmitt trigger 516 which serves to square up the output signal from comparator 512 and which is selected in the preferred embodiment to be implemented by a CD4093 NAND Schmitt trigger gate available from RCA Semiconductor. This is a commonly available CMOS Schmitt trigger gate produced by a wide variety of semiconductor vendors. It will be appreciated by those skilled in the art that other types of Schmitt triggers as well as other types of gates may be substituted therefor without deviating from the scope or spirit of the present invention.

The clock reset signal produced by Schmitt trigger 516 is available as the clock reset signal on line 253. The reset function, that is, when the rectifier diode 120 is no longer forward-biased, is indicated by a rising edge signal on the output of line 253. This is an asynchronous signal which is produced every time diode 120 fails to remain forward-biased. The output of Schmitt trigger 516 is also used to clock D-type flip-flop 517. This flip-flop is a commonly available CMOS device numbered CD4013 available from RCA Semiconductor. This type of flip-flop is a commonly available off-the-shelf device sourced by many semiconductor vendors in the industry. It will be appreciated by those skilled in the art that other types of flipflops may be substituted therefor without deviating from the scope or spirit of the present invention.

Figure 6:
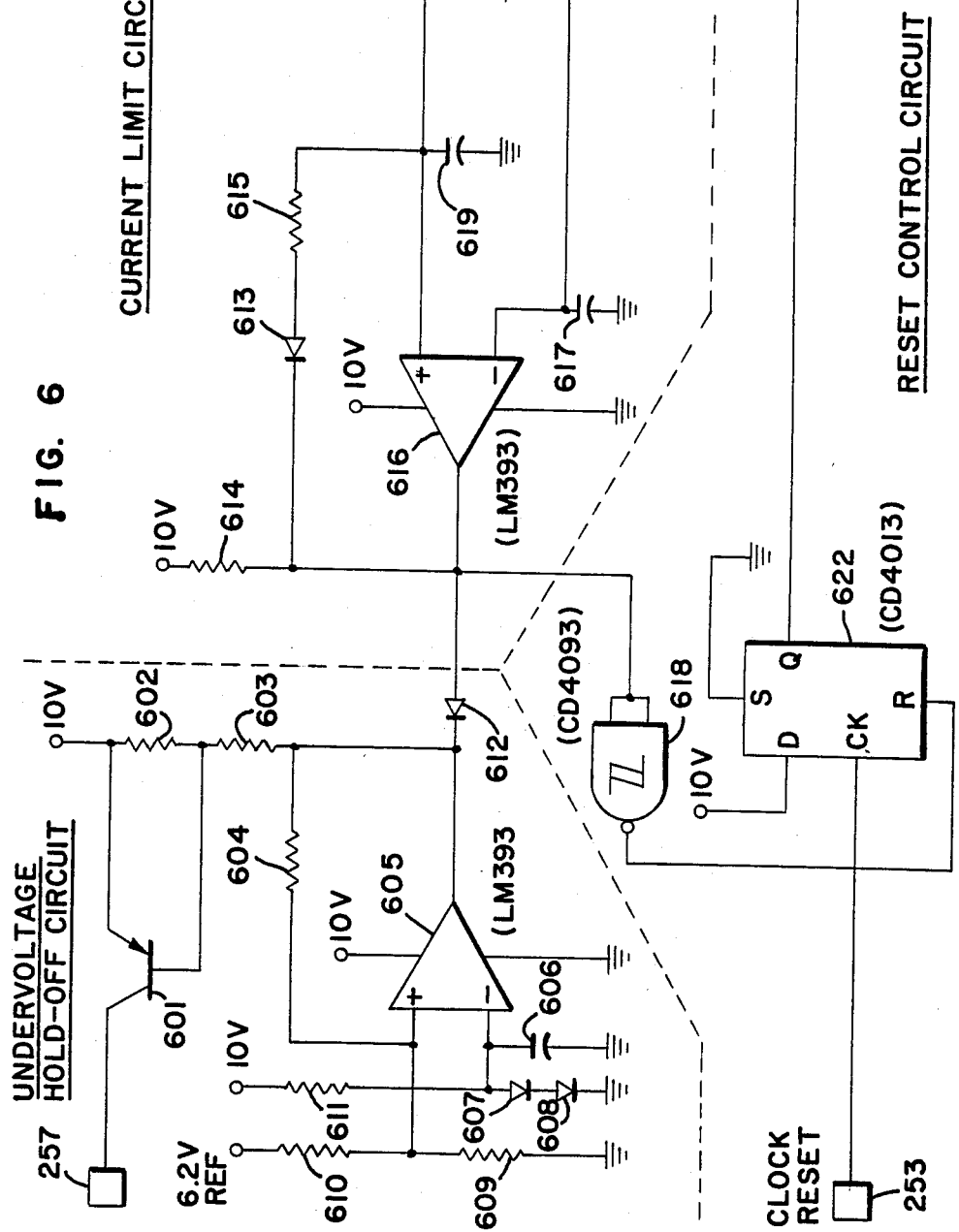
FIG. 6 is an electrical schematic diagram showing the combination of a undervoltage hold-off circuit and a current limit circuit for use by the reset control circuit.

The output of flip-flop 517 is a complementary set of signals indicating the reset of the inductor. The set line of flip-flop 517 is tied inactive while the reset line is tied to a logical function between the signals appearing on lines 150 and 257. The FET drive signal on line 150 is the signal used to drive FET transistor 119 which controls the switching of the current through inductor 115. The under-voltage hold-off signal on line 257 indicates that the bias supply voltage is below the minimum threshold necessary for proper operation of the power factor correction and control circuit. The origin of this signal will be described later in this specification, and is shown in FIG. 6. The FET drive signal is buffered through transistor 518 and isolated from the under-voltage hold-off signal 257 through diode 519. The two signals are effectively OR'ed and used to drive the reset input to D-type flip-flop 517. The under-voltage hold-off signal is a steady state DC voltage of a normally low voltage when the circuit is operating properly. If there is insufficient bias voltage to supply the circuitry of the power factor correction control circuit, a high-active signal will be present on line 257 and which will effectively set the initial state of flip-flop 517 to guarantee that the RESET signal is the high signal at start of the on-time period. Under normal operation, line 257 does not interfere with the output of the reset signals on lines 550 and 551.

The FET drive signal is a square wave of varying duty cycle and frequency which is used to drive the gate of FET transistor 119. By using the FET drive signal to drive the reset input to D-type flip-flop 517, the reset signal produced on line 550 and its complementary value on line 551 appears as a pulse of short duration whenever the reset detect circuit detects diode 120 in reverse bias mode. Hence, whenever diode 120 fails to remain forward biased, a short pulse indicating the reset situation will appear on line 550 with its complementary value on line 551.

FIG. 6 shows the circuit for the under-voltage hold-off control and the current limit control functions of the power factor control circuit. Also included in FIG. 6 is a portion of the reset control circuit. The under-voltage hold-off circuit shown on the left of FIG. 6 functions to compare the 6.2 V DC reference that is divided down by resistors 610 and 609 against a 1.4 V reference derived by the nominal 0.7 V drop of diodes 607 and 608. Comparator 605 is an LM393 low-offset voltage comparator manufactured by National Semiconductor. This comparator is a commonly available off-the-shelf device which is sourced by a number of semiconductor vendors. As will be appreciated by those skilled in the art, a wide variety of comparators may be substituted therefor without deviating from the spirit or the scope of the present invention.

The 10 V bias supply voltage is current limited through resistor 611 and applied to the inverting input of comparator 605. Diodes 607 and 608 provide approximately a 1.4 V forward-bias drop which fixes the threshold comparison voltage to the divided-down reference voltage applied to the noninverting input.

The output of comparator 605 is used to drive two places. In the upper left corner of FIG. 6, the under-voltage hold-off signal for the reset detect portion of the reset control circuit is derived by inverting the output of comparator 605 through transistor 601. Hence, the value on line 257 is the inverted value found on the output of comparator 605. Resistors 602 and 603 select the proper bias voltages to place ransistor 601 in saturation or OFF mode, depending on the value of the output of comparator 605.

The output of comparator 605 is also connected to small signal diode 612 which functions to isolate comparator 605 from comparator 616 such that only inactive values on the output of comparator 605 have an effect on the output line attached to the output of comparator 616. When the output of comparator 605 is a low signal, diode 612 is forward-biased, which functions to pull the output line from comparator 616 to a low value. In this fashion, diode 612 serves to form a wired OR (low-active) function with the outputs of comparators 605 and 616. This wired OR function serves to OR the output value of the under-voltage hold-off circuit with the output value of the current limit circuit. This OR function drives Schmitt trigger 618 which forms an invert function and is implemented using a CD4093 integrated circuit available from RCA Semiconductor. The combination of the wired OR function and the Schmitt trigger invert function serves to create an OR function (high-active) which drives the reset input into D-type flip-flop 622. This D-type flip-flop is implemented using a CD4013 D-type flip-flop available from RCA Semiconductor. It will be recognized by those skilled in the art that other types of D-type flip-flops available from a wide variety of vendors can be substituted therefor.

The current limit circuit found on the righthand side of FIG. 6 is designed to sense an excessive amount of current flowing through FET transistor 119 as sensed by current sensing resistor 124. The current sensed on line 151 drives the inverting input to comparator 616. This comparator is an LM393 identical to the comparator 605 also shown in FIG. 6. The noninverting input of comparator 616 is biased by the 6.2 V reference divided down by voltage divider ladder comprised of resistors 621 and 620. The output of comparator 616 is normally high and pulled up by pull-up resistor 614 when the current through FET transistor 119 is within acceptable limits. If an excessive amount of current is drawn, comparator 616 will go low, indicating an over-current condition. Diode 613 and resistor 615 are used to form a positive feedback (hysteresis) to square up the output of comparator 616.

In the lower half of FIG. 6, a portion of the reset control circuit is shown. The clock reset line 253 drives the clock input to D-type flip-flop 622, which serves to gate the clock reset with the OR'ed function between the current limit circuit and the under-voltage hold-off circuit. Thus, if an excessive amount of current is detected by the current limit circuit, or if an insufficient amount of bias voltage is available for driving the power factor control circuit, the reset input to D-type flip-flop 622 will be set active and the drive enable signal will be inhibited on line 650.

Figure 7:
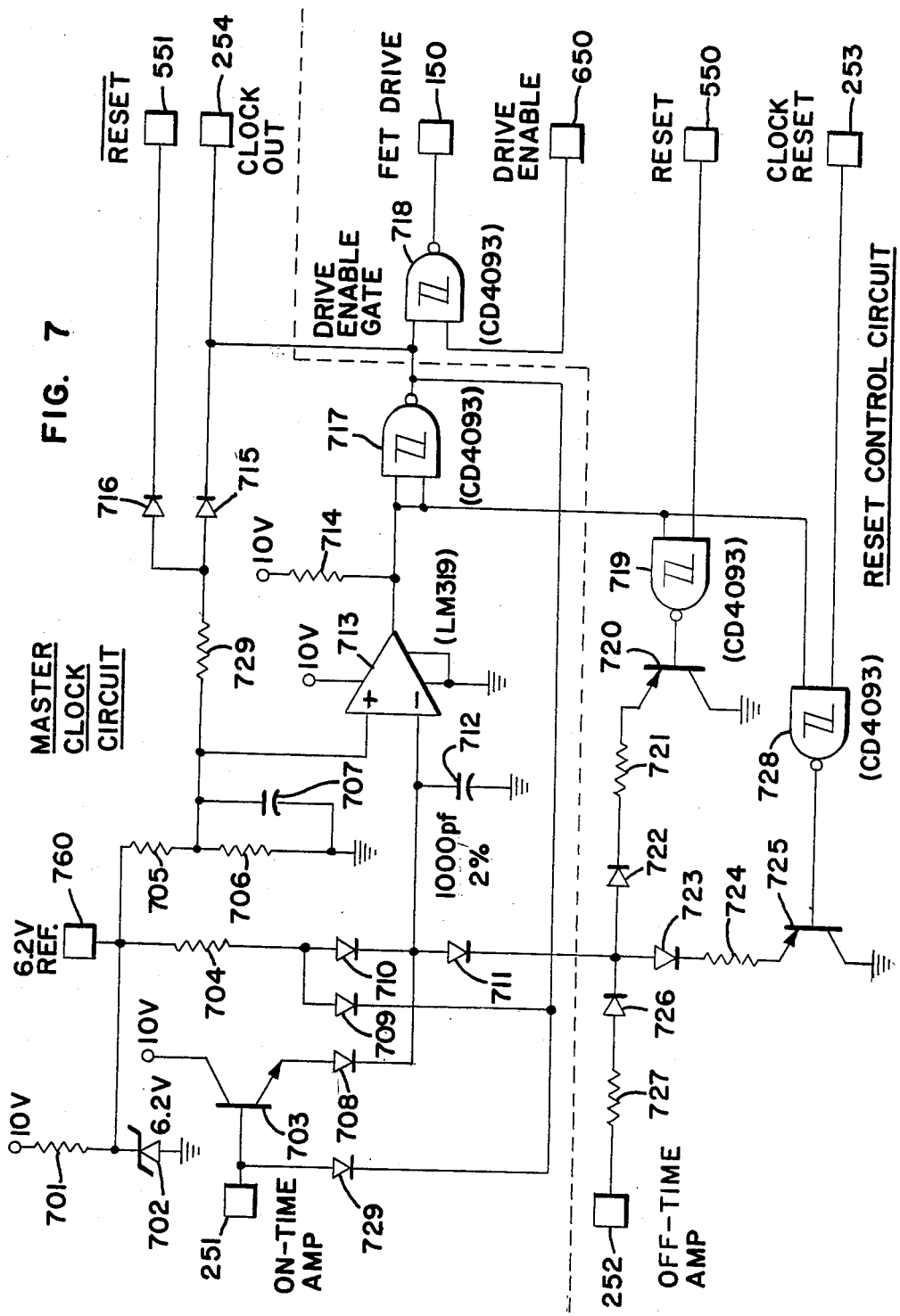
FIG. 7 is an electrical schematic diagram of the master clock circuit including a portion of the reset control circuit.

FIG. 7 shows the master clock circuit and the main portions of the reset control circuit. The heart of the master clock circuit is the 1,000 pf capacitor 712 connected to the inverting input of comparator 713. Comparator 713 is an LM319 precision high-speed comparator from National Semiconductor. This comparator is an off-the-shelf commonly available integrated circuit available from a variety of semiconductor vendors. The noninverting input to comparator 713 is connected to the 6.2 V reference through the voltage divider comprised of resistors 705, 706 and feedback resistor 729. The 6.2 V reference is generated by zener diode 702 supplied from the bias supply through resistor 701.

Comparator 713 and capacitor 712 form a timing circuit based upon the amount of time it takes to charge and discharge capacitor 712. Comparator 713 has the ability to time either charging or discharging cycles of capacitor 713 by changing the reference value on the noninverting input of the comparator through resistor 729. The normal reference value is the 6.2 V reference divided down by resistor divider network 705 and 706 to 4.0 V. However, the voltage threshold on the noninverting input of comparator 713 can be changed by the RESET 551 or CLOCK OUT 254 signals through diodes 716 and 715 respectively. These signal lines when set to a low value shift the voltage threshold one-half volt lower to 3.5 V. This allows comparator 713 to detect when capacitor 712 is nearly discharged. Hence the operating range of voltages on timing capacitor 712 is 3.5–4.0 V.

Capacitor 712 is charged and discharged through various paths which operate to change the rate of charge and discharge. The rate of charge and discharge of capacitor 712 determines the frequency and duty cycle of the FET drive signal found on line 150. The FET drive signal is gated by the drive enable gate, which serves to inhibit the FET drive on under-voltage conditions or over-current conditions, as was previously discussed.

There are essentially two discharge paths for capacitor 712. The first discharge path is through diode 711, diode 722, resistor 721, and transistor 720. This is the fast discharge path controlled by the reset signal on line 550. The base of transistor 720 is driven by Schmitt trigger NAND gate 719, which is implemented in the preferred embodiment as a CD4093 Schmitt trigger gate available from RCA Semiconductor. Since the base of transistor 720 is driven by a digital gate, it operates either in fully ON or fully OFF position. In the fully ON position, this discharge path of capacitor 712 allows a 0.5 microsecond bleed-down time through resistor 721 until the voltage on the timing capacitor hits the lower threshold of 3.5 V.

The second discharge path for capacitor 712 is through diode 711, diode 723, resistor 724, and transistor 725. The base of transistor 725 is controlled by Schmitt trigger NAND gate 728, which is implemented in the preferred embodiment as a CD4093 Schmitt trigger available from RCA Semiconductor. Once again, since the base of transistor 725 is controlled by a digital logic gate, transistor 725 is either in the fully ON or fully OFF possition. The path through transistor 725 is the slow discharge path, which is the default condition if reset detect circuit does not detect the reset condition on diode 120. This discharge path allows for approximately a 10-microsecond bleed-down time for capacitor 712 until its voltage hits the lower threshold of 3.5 V.

The fast discharge path through transistor 720 and the slow discharge path through 725 can be modified by the off-time amplifier output signal available on line 252 supplied through resistor 727 and diode 726. The cathode of diode 726 is wired to the anodes of diodes 722 and 723 in the fast and slow discharge paths respectively. This connection forms a current summing point which allows the off-time amplifier to modify the discharge rate by injecting current into the summing point. As was previously discussed, the output of the off-time amplifier is a DC voltage error signal from 4.0 V to 7.3 V DC in response to the amount of voltage exceeding 390 V DC up to 410 V DC. In this fashion, the off-time amplifier modifies the discharge rate of capacitor 712 which controls the amount of time that FET transistor 119 is in the OFF position. Hence, when the DC voltage across bulk capacitor 121 exceeds 390 V DC, the off-time amplifier operates to slow the discharge of capacitor 712 and extend the amount of time that the transistor 119 is in the OFF position. This limits the amount of time that is available for charging inductor 115 with current and hence modifies the clock frequency. The off-time amplifier only rarely modifies the actual off-time of the FET drive signal since the reset detect circuit usually determines the off-time interval sensed by the current through inductor 115 dropping to zero. The impact of the off-time amplifier on the off-time interval of the FET drive signal is usually seen only when there is no load on the DC output. At this point, the on-time amplifier would be calling for minimum ontime pulsewidth, so changing the off-time pulsewidth would vary the frequency.

There are essentially two charging paths for capacitor 712. The first charging path is the default charge path from the 6.2 V reference through resistor 704. This fixed charge path fixes the maximum charging time to approximately 45 microseconds. In order to prevent continued charging of capacitor 712 during a hold period, diode 709 effectively inhibits the charging path through diode 710 by sensing the active clock signal out of Schmitt trigger 717.

The second charging path for capacitor 712 is through transistor 703 and diode 708. This is a variable charging path that is controlled by the output 251 of the on-time amplifier. As was previously discussed, the output of the on-time amplifier is a DC error feedback voltage which ranges btween 4.0 V DC and 7.3 V DC in response to varying DC output voltages between 380 V DC and 400 V DC. This feedback voltage applied to the base of transistor 703 varies the amount of charging current through diode 708 available for charging capacitor 712. Diode 729 serves the same purpose as diode 709 in that when capacitor 712 is discharging, the clock output signal is low and pulls the base of transistor 703 to a low value, effectively disabling the charge current path to capacitor 712.

When the on-time amplifier output is approximately zero volts, this indicates that the voltage across bulk capacitor 121 is less than or equal to 380 V DC, which is less than the acceptable output voltage. Zero volts on the base of transistor 703 effectively inhibits current flowing from the 10V bias supply through diode 708 to the summing point at the inverting input of comparator 713. Since the current path through 708 is disabled, the fixed current path through diode 710 is the only charging source for capacitor 712. This is a slow charging source which will provide approximately a 45-microsecond on-time for FET switching transistor 119.

The longer the on-time for transistor 119, the more charging current is supplied to inductor 115 and eventually transferred to the DC output. As the voltage approaches 390 V DC, the output of the on-time amplifier 251 approaches 4.0 V DC on the base of transistor 703. This base voltage will turn ON transistor 703, allowing a larger amount of current to pass from the 10 V bias supply through diode 708 to the summing point on the inverting input of comparator 713. With transistor 703 fully ON when the output of on-time amplifier 251 reaches 400 V DC, the clock circuit will provide a very short charging time for capacitor 712 resulting in an approximately 0.5 microsecond charging time for inductor 115.

From the foregoing, it is clear that the ontime amplifier and off-time amplifier change the rate of charging and discharging respectively of the timing capacitor 712. Also, the discharge rate is dependent upon reset line 550 and clock reset line 253 for determining a fast discharge or slow discharge path respectively. Reset line 551 and clock output line 254 serve to change the reference point on the noninverting input of comparator 713, depending on whether the comparator is timing an on-time or an off-time interval. The width of the on-time and off-time intervals is determined by the on-time amplifier and the reset detect, respectively. Recalling that the reset signal indicates that the diode 120 is no longer forward-biased, this is an indication that inductor 115 no longer has sufficient stored current to charge through rectifier 120 to supply current to the DC output based upon the voltage on bulk capacitor 121.

Figure 8:
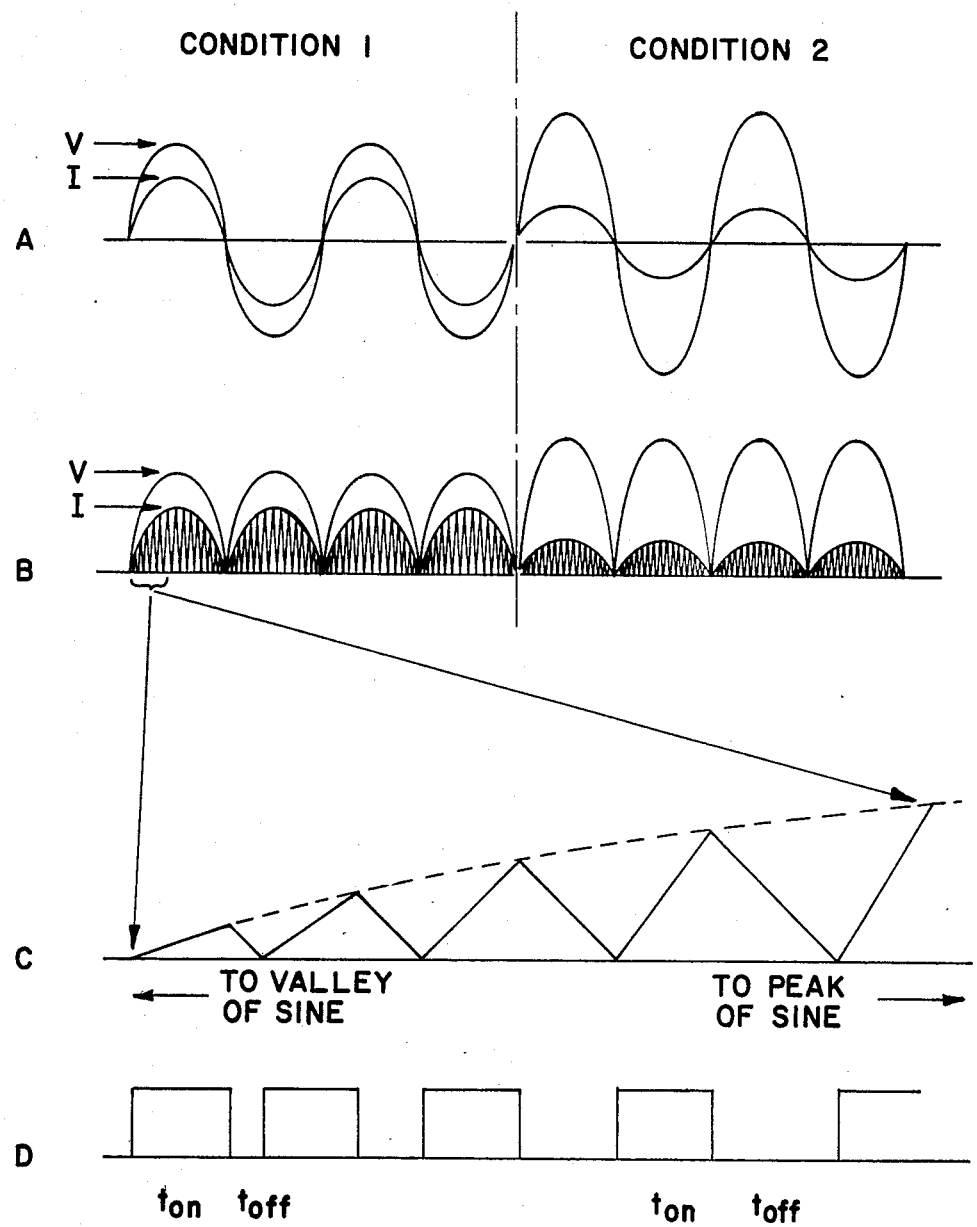
FIG. 8 shows current and voltage waveforms taken at various points as indicated in FIG. 1.
Figure 9:
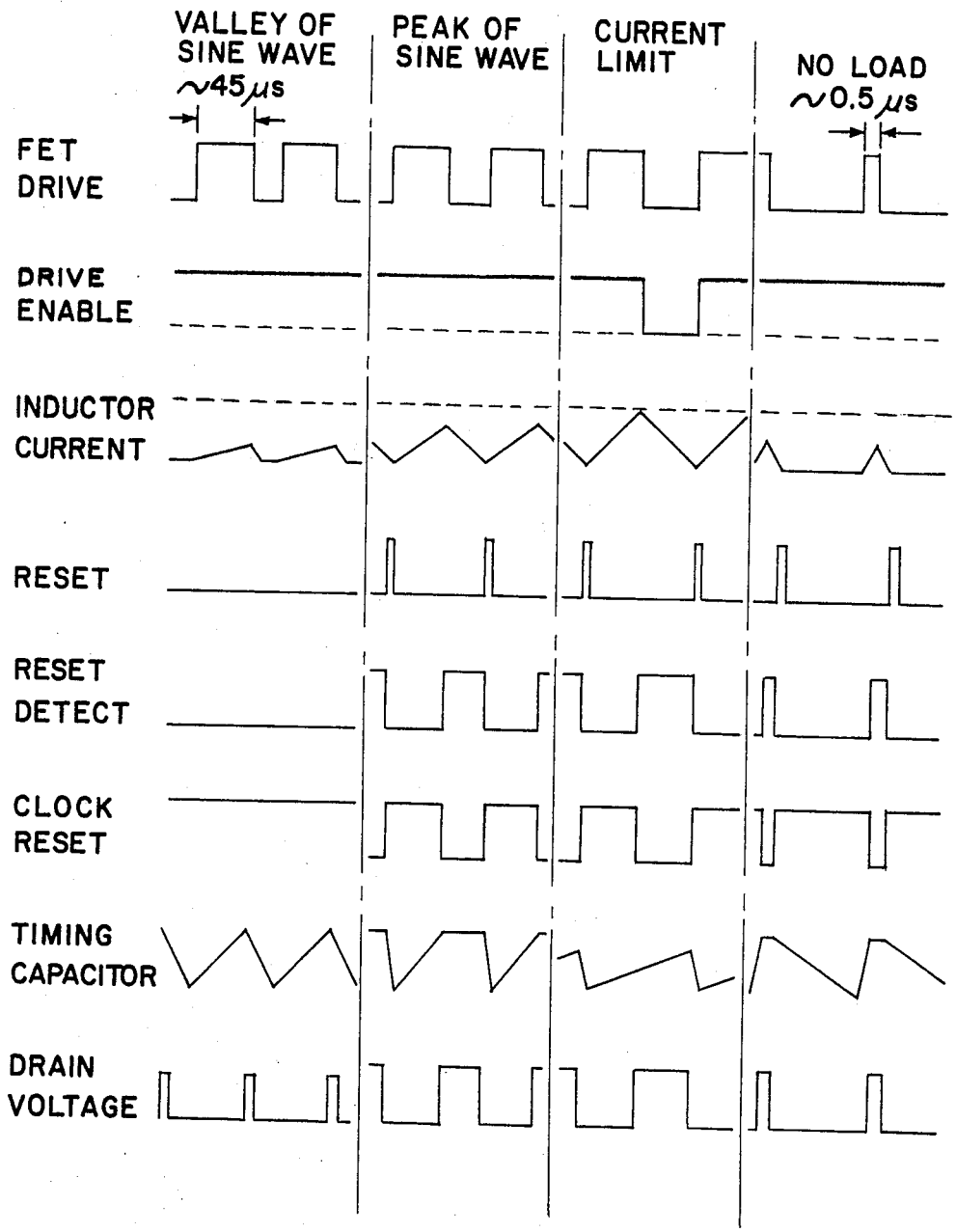
FIG. 9 is a detailed timing diagram showing electrical waveforms taken at various points in FIG. 7 under four different conditions.

A better understanding of the operation of the overall circuit is possible by reference to FIG. 1 in conjunction with the timing diagrams of FIGS. 8 and 9. Referring first to FIG. 8, the graph labeled A on the top of FIG. 8 shows current and voltage waveforms taken from point A on the AC input in FIG. 1. The graphs show the current and voltage waveforms for two different conditions. Condition 1 and condition 2 could be either lower and higher line voltages, or higher and lower load conditions, respectively. Either a lower line voltage or a higher load will result in more current drawn from the AC input. The average current shown for graph A is seen to be proportional and in phase with the voltage on the line. This proportionality and phase relationship is maintained by the present invention across varying conditions. As was previously mentioned, the RFI filter front end shown in FIG. 1 on the switching power supply may result in a slight phase shift which becomes more noticeable with lighter loading conditions. This is not a condition caused by the switching power supply, but is an unavoidable situation due to the requirements of filtering on switching power supplies.

Graph B shows the voltage and current waveforms taken at point B on FIG. 1. Here, the voltage and current waveforms are taken after bridge rectifier 112, and hence only have positive values with respect to ground. The voltage drawn from the AC input is still of the same magnitude as that shown in graph A. The phase relationship between the voltage and current is maintained constant, but as can be seen by the greatly exaggerated current waveform, the current drawn from the line is actually a series of short pulses. The average current of the pulses shown in graph B are of the same magnitude as the current drawn from the line as shown in graph A. The RFI filter front end of the switching power supply shown in FIG. 1 inhibits the pulses from reaching the AC line. These pulses or spikes shown in graph B represent the charging and discharging of current through inductor 115. As was previously described in detail, the current pulses are generated by alternately shorting and opening inductor 115 to ground by turning FET transistor 119 on and off.

Graph C is a greatly exaggerated current waveform taken from a short portion of the current waveform shown in graph B. Graph D should be viewed together with graph C, since it is the clocking FET drive signal on line 150 driving the gate of transistor 119. The dashed line in graph C indicates the peak current which rises as the voltage rises on the sinusoidal waveform of the voltage. In the greatly exaggerated graph C the rising peak current is shown to the right, while the falling peak current is shown to the left toward the valley of the sine wave. At zero voltage, zero current is available for charging inductor 115. As one progresses toward the peak of the sine wave of the voltage waveform, increased amounts of current are available for charging of inductor 115. In graph D, the value $t_{ON}$ for the FET drive signal is approximately 45 microseconds, or the maximum allowed on-time set by the on-time amplifier. The off-time $t_{OFF}$ is set by the reset detect circuit which starts the on-time cycle once again when it is determined that zero current is passing through diode 120 for charging the bulk capacitor 121. The off-time amplifier at this point in the sine wave is producing zero volts out, such that the discharge paths for the timing capacitor are not being affected. Thus, the reset detect circuit is controlling the off-time. As the voltage rises toward the peak of the sine wave, it can be seen by the greatly exaggerated graph D that the off-time continues to grow longer based on the amount of time it takes to discharge the current in inductor 115. Although the on-time is fixed at approximately 45 microseconds for each charging cycle, since the voltage available across inductor 115 is rising toward the peak of the sine an increased amount of current is available for charging. Thus, the inductor charges at a faster rate during the same fixed time interval. This causes a longer discharge time which extends the time between pulses. This results in a frequency-modulated FET drive signal which varies across the sine wave. The clocking frequency for the switching FET transistor 119 slows as we approach the peak of the sine and rapidly increases as we approach the valley of the sine.

FIG. 9 shows detailed timing diagrams of the operation of the master clock and reset control circuits of FIG. 7, and these Figures should be viewed together. FIG. 9 is divided into four modes of operation, which clearly explain the intricate workings of the present invention. The first portion describes the operation of the master clock circuit near the valley of the sine wave on the input line voltage. The second portion of FIG. 9 shows the operation of the master clock circuit near the peak of the sine wave. The third mode of operation of the present invention is the current limit inhibit operation, which limits start-up currents and over-current conditions on the load. The last mode of operation of the present invention is the timing diagrams when no load is connected across the DC outputs. The timing diagrams for the various modes of operation of the present invention are shown for illustrative purposes only, and are not drawn to scale.

Near the valley of the sine wave of the line voltage, very little current is available for charging inductor 115. The maximum on-time of the FET drive is selected by the on-time amplifier, but is limited by the minimum charge rate through resistor 704 and diode 710 for timing capacitor 712. This minimum charging rate is selected to ensure that the frequency of the FET drive signal does not fall below 25 kHz. This will ensure that the operation of the circuit remains above the audible range of human hearing. If the circuit were allowed to operate below that range, an annoying highpitched sound would be heard by the users of this invention.

The off-time of the FET drive shown in FIG. 9 near the valley of the sine wave is fixed at a minimum width by the clock reset signal which enables the 10-microsecond discharge path. It can be seen that the inductor current near the valley of the sine wave completely discharges before the off-time interval is terminated. The illustration of the inductor current in FIG. 8, graph C, was for illustrative purposes only, and did not show the inactive portion of the inductor current during the off-time, as is shown in FIG. 9. This inactive portion of the inductor current during the off-time interval is very short in duration, since as the voltage rises along the sinusoidal curve of the line voltage the inductor current is sufficient to force a longer off-time interval to allow the inductor to completely discharge across diode 120.

The reset detect circuit producing both the reset and reset detect lines on the timing diagrams of FIG. 9 does not detect any forward biasing of diode 120 at all, since insufficient current is charged into inductor 115 to forward-bias diode 120. The timing capacitor is operating at the maximum on-time and minimum off-time rates in an attempt to generate sufficient current to charge inductor 115 to charge bulk capacitor 121. The timing diagram waveform for the timing capacitor shown in FIG. 9 shows a fixed charge and discharge rate selected by the on-time and off-time amplifiers. The drain voltage on FET switching transistor 119 is shown as the last waveform on FIG. 9. The drain voltage shown is less than the required voltage necessary to forward-bias diode 120 to supply a charging current to DC output bulk capacitor 121. The drain voltage is shown in short pulses of less than acceptable voltage available only when the inductor is discharging.

The operation of the master clock circuit near the peak of the sine wave of the supply voltage is also shown in FIG. 9. Assuming a high load demand on the switching power supply, it can be seen that the FET drive on-time remains at approximately 45 microseconds since the on-time amplifier is indicating a demand for voltage and the voltage across bulk capacitor 121 is less than 390 V DC. The drive enable signal remains active throughout this period since there is no overcurrent condition and there is no under-voltage condition on the bias supply. The inductor current shown for the operation of the circuit near the peak of the sine wave shows a healthy charge current during the ontime of the FET drive and a full discharge of all inductor current across diode 120 with the inductor current reaching zero before recharging of inductor 115 is undertaken. The reset waveform shows that when the inductor no longer is able to forward-bias diode 120 due to the insufficent discharge current from the inductor, a reset detect signal is produced by the reset detect circuit and a reset pulse is produced by the reset control circuit. This reset pulse is used to enable the fast discharge path and restart the charging of the inductor. In this fashion the inductor is kept operating at the verge of discontinuous/continuous mode, since the current through the inductor just reaches a zero state when recharging occurs. The clock reset line is shown to go active when the reset detect line goes inactive, which changes the rate of discharge on timing capacitor 712 to allow for a fast discharge so that recharging of the timing capacitor can occur to time the next ON interval. The timing capacitor waveform is shown to ramp up slowly during the ON period and to hold at a voltage level during discharge of the inductor. When the inductor current reaches zero, the discharge rate is changed to rapidly discharge the voltage on timing capacitor 712 to a lower limit so that a new on-time interval may be timed. The drain voltage shown in the bottom line of FIG. 9 for the peak of the sine wave operation shows a strong drain current on FET transistor 119, indicating sufficient voltage for forward-biasing diode 120 and charging bulk capacitor 121.

During initial power-up conditions or when an excessive load is placed on the output terminals of the switching power supply, the current limit circuit operates to limit the amount of current drawn through the inductor. The current limit circuit protects the switching power supply and prevents inductor 115 from going into saturation. As shown in FIG. 9, the FET drive signal remains operating at its demand levels, but when an excessive amount of inductor current is sensed by over-current sensing resistor 124, the drive enable signal drops to an inactive level to cut short the on-time of the switching waveform. The circuit continues to operate as normal, in that during the off-time interval the inductor current is allowed to discharge to zero and a reset pulse is generated when zero current is detected across diode 120. The reset detect and clock reset circuits operate as shown in the previous diagrams. The timing waveform for the voltage on the timing capacitor shown in FIG. 9 shows a long slope indicating a need for a long charging time to supply the necessary current to meet the demands of the load. Since the drive enable signal has cut short the on-time interval, it can be seen in the timing diagram of FIG. 9 that approximately half of the timing interval has been eliminated by the drive enable signal cutting short the ontime due to an overcurrent condition. Once again, a fast discharge path is used at the end of the discharge interval which is invoked by the reset detect signal. Once the timing capacitor is fast discharged, the slow charge path is enabled once again in an attempt to meet the current demands on the load. The drain voltage shown on the bottom line of FIG. 9 shows that approximately 400 V DC is available for charging the bulk capacitor 121 on the output of the switching power supply.

The last column of timing diagrams in FIG. 9 are drawn to explain the operation of no-load on the present invention. In a no-load situation, the switching power supply must maintain a charge on the bulk storage capacitor and compensate for any internal losses that may occur even though no load is attached to the output terminals. In this situation, the on-time amplifier is indicating an excessive amount of DC voltage on the output and hence the on-time interval is shortened to its minimum amount. As can be seen in the FET drive timing line in FIG. 9 for no-load conditions, a very short on-time interval of approximately 0.5 microsecond is produced by the FET drive output while an extended off-time interval is produced. In any event, the overall frequency of the FET drive signal is not allowed to drop below 25 kHz so that the switching frequency remains above the audible level for humans. The drive enable signal remains active since there is no undervoltage condition or current limit condition. The amount of inductor current is kept quite small by shortening up the charge time available by keeping the FET drive on-time interval very narrow. As can be seen in FIG. 9, very small spikes of inductor current are generated to maintain the output voltage at its proper level. Once again, when the inductor current discharges to a zero level, the reset detect circuit generates a reset detect signal and a reset pulse indicating that the timing capacitor should be discharged to begin a new timing interval. The voltage on the timing capacitor as shown in FIG. 9 for the no-load conditions indicates a very long discharge cycle with a very short charge cycle on the timing capacitor. This long discharge cycle is selected by the off-time amplifier injecting current into the discharge path shown in the reset control circuit of FIG. 7. This slows the discharge time and extends the off-time interval. The on-time interval is exemplified by a very short charging time interval on the timing capacitor since the charge path through transistor 703 and diode 708 as shown in FIG. 7 is fully active. This is caused by the on-time amplifier driving the base of transistor 703 with 7.3 V, ensuring a full ON condition and a fast charge path. The drain voltage for a no-load condition as shown in FIG. 9 is a series of very short pulses of approximately 400 V DC levels which are all that is necessary to maintain the bulk storage capacitor 121 at a full charge level.

The situation not shown in FIG. 9 is the under-voltage hold-off situation. This situation is analogous to the current limit situation in which the drive enable signal drops to an inactive level, inhibiting any further FET drive operation. In the case of an under-voltage hold-off situation, the drive enable signal will remain low for successive cycles rather than for a single cycle as shown in a current limit situation. Once the bias voltage reaches an acceptable level, the drive enable signal will go active and allow the FET drive to drive the clocking signal into the gate of switching transistor 119 once again.

Although specific logic configurations and electrical configurations have been illustrated and described for the embodiment of the switching power supply with automatic power factor correction described herein, it will be appreciated by those of ordinary skill in the art that any conventional logic or electrical arrangements which are calculated to achieve the same purpose may be substituted for the specific configurations shown. Thus, although conventionally available MSI and SSI logic is generally preferred due to its availability, the logic described herein may be implemented through the use of discrete components or it may be all combined to a greater or lesser degree in a fewer number of LSI or VLSI components. Also, although an inductor 115 has been described throughout in the preferred embodiment, any component exhibiting inductive characteristics may be substituted, such as a transformer. The rectifier diode 120, which also serves as a current sense, could be any rectification mean such as a bridge, and the over-current sense of resistor 124 could be substituted by the secondary of a transformer such as the aforementioned transformer as substitute for the inductor 115. The switching FET ransistor 119 may be implemented using MOSFETs or bipolar technology including but not limited to such current switches as SCR's and triacs. The power source on lines 101 and 102 may be off-line or battery (DC) as well as another offline converter.

In addition, it will be readily appreciated by those of ordinary skill in the art that although positive logic conventions have hereby been employed, negative logic conventions may alternatively be utilized where a one-level corresponds to a lower voltage than a zero-level. Additionally, although specific logic components and associated conditions necessary for the operation of this system have been mentioned in order to describe the preferred embodiment of the present invention, other linear and digital logic configurations similar to those mentioned may alternatively be employed, such as the substitution of NOR-type logic for NAND-type logic, or the substitution of operational amplifiers for comparators, without any deviation from the concepts of the invention disclosed.

While the present invention has been described in connection with a preferred embodiment thereof, it will be understood that many modifications will be readily apparent to those of ordinary skill in the art, and this application is intended to cover any adaptations or variations thereof. Therefore, it is manifestly intended that this invention be limited only by the claims and the equivalents thereof.

What is claimed is:

1. An off-line switching power supply with automatic power factor correction, comprising:
   input connection means for connecting to a power source and for receiving input current;
   first rectifier means connected to said input connection means for rectifying said input current and for producing rectified input current;
   inductor means for charging and discharging said rectified input current;
   switching means connected to said inductor means and to said first rectifier means for placing said inductor means in a first position so that said rectified input current from said first rectifer means is charged in said inductor means and for placing said inductor means in a second position so that said charged rectified input current is discharged from said inductor means;
   second rectifier means connected to said inductor means for receiving said discharged rectified input current and for producing rectified inductor current when said inductor means is placed in said second position by said switching means;
   capacitor means connected to said second rectifier means for receiving said rectified inductor current, for charging the voltage produced when said inductor means is placed in said second position by said switching means and for discharging regulated direct current and voltage;
   output connection means connected to said capacitor means for driving a load with said discharged regulated direct current and voltage;
   control means connected to said switching means for alternately placing said inductor means in said first and said second positions, which comprises:
   on-time amplifier means connected to said capacitor means for generating an on-time error signal in response to said voltage across said voltage capacitor;
   off-time amplifier means connected to said voltage storage means for generating an off-time error signal in response to said voltage across said voltage storage means;

reset detect means connected to said second rectifier means for generating a reset signal when said rectified inductor current through said second rectifier means is approximately zero;

clock circuit means for producing a high frequency clock signal to control said switching means having an on-time interval corresponding to the amount of time said switching means places said inductor means in said first position and having an offtime interval corresponding to the amount of time said switching means places said inductor means in said second position;

the length of said on-time interval controlled by the magnitude of said on-time error signal; and the length of said off-time interval controlled by said reset signal and said off-time signal so that said reset signal operates to terminate said off-time interval and said off-time error signal operates to extend the off-time interval beyond the termination point set by said reset signal.

2. The device according to claim 1, further including gating means connected to said control means and operable for terminating said on-time interval early when said rectified input current passing through said switching means exceeds a predetermined threshold.

3. The device according to claim 1, further including bias supply means for generating a bias voltage for the components of said control means; and under-voltage hold-off means connected to said control means and said bias supply means for preventing said control means from placing said inductor means in said first position in response to said bias supply voltage being below a predetermined threshold.

4. The device according to claim 1, further including minimum frequency means connected to said clock circuit means for ensuring that said on-time signal, said off-time signal, and said reset signal do not produce a clock signal below a predetermined frequency.

5. The device according to claim 1, further including radio frequency interference filter means connected to said input connection means for preventing noise produced by said switching means from being passed back to said power source.

6. The device according to claim 1, wherein said on-time signal operates to decrease said on-time interval in response to an increasing voltage on said voltage storage means; and said on-time signal operates to increase said on-time interval in response to a decreasing voltage on said voltage storage means.

7. The device according to claim 1, wherein said off-time signal operates to increase the extension of said off-time interval in response to an increasing voltage on said voltage storage means; and said off-time signal operates to decrease the extension of said off-time interval in response to a decreasing voltage on said voltage storage means.

8. A method for controlling power factor in switching power supplies, comprising the steps of:

rectifying line current;

alternately switching an inductor from a first position in parallel with said rectifier such that said inductor stores rectified line current to a second position in series with said rectifier and a load such that said inductor discharges said stored current into said load, said switching including the substeps of:

(a) placing said inductor in said first position to charge said inductor with said rectified line current;

(b) sensing the voltage across said load;

(c) selecting a first time interval in response to the voltage across said load;

(d) placing said inductor in said second position at the end of said first time interval;

(e) sensing the discharge current through said inductor;

(f) selecting a second time interval measured from the end of the first time interval to the point where the discharge current through said inductor is approximately zero;

(g) sensing the voltage across said load;

(h) selecting a second time interval extension in response to the voltage across said load;

(i) placing said inductor in said first position at the end of said second time interval increased by said second time interval extension, if any; and (j) repeating steps (a) through (i).

9. The method according to claim 8, wherein step (d) further includes the substeps of:

sensing the current through said inductor; and placing said inductor in said second position before the end of said first time interval if the current through said inductor exceeds a predetermined limit.

10. A switching power supply for producing DC voltage capable of operating from either DC or AC supply lines having a wide variation of voltage and frequency with automatic power factor correction, comprising:

line connection means for connecting to a power grid and for receiving line current;

first rectifier means connected to said line connection means having first and second output terminals for producing rectified line current;

inductor means for charging said rectified line current and for discharging said charged rectified line current having a first inductor terminal connected to said first output terminal of said first rectifier means and having a second inductor terminal;

switching transistor means for operating in a first mode to connect said second inductor terminal to said second output terminal of said first rectifier means so that said inductor means charges said rectified line current and for operating in a second mode to disconnect said second inductor terminal from said second output terminal of said first rectifier means so that said charged rectified line current is discharged from said inductor;

second rectifier means connected to said second inductor terminal for receiving said discharged rectified line current and for producing rectified inductor current;

storage capacitor means having a first terminal connected to said second rectifier means for receiving said rectified inductor current and having a second terminal connected to said second output terminal of said first rectifier means;

first DC output terminal connected to said first terminal of said storage capacitor means and second DC output terminal connected to said second output terminal of said first rectifier means; and control circuit connected to said switching transistor means, said second terminal of said first rectifier means, said second terminal of said inductor means, and said first terminal of said storage capacitor means for alternately placing said switching means in said first mode and said second mode, which comprises:

on-time amplifier means for sensing the voltage across said storage capacitor and for controlling within preset limits a first time interval responsive to the voltage across said storage capacitor;

reset detect means for sensing when said rectified inductor current through said second rectifier means is approximately zero and for controlling within preset limits a second time interval;

off-time amplifier means for sensing the voltage on said storage capacitor and for extending said second time interval in response to approximately no-load conditions on said DC outputs; and clock circuit means for producing a high-frequency clock signal comprised of an alternating sequence of said first time interval followed by said second time interval so that said first time interval operates to place said switching transistor means in said first mode and said second time interval operates to place said switching transistor means in said second mode.

11. The device according to claim 10, further including current sense means connected between said switching means and said second terminal of said rectifier means for sensing the amount of rectified line current passing through said switching transistor means; and current limit means connected to said current sense means and to said on-time amplifier means for shortening said first time interval in response to current in said current sense means exceeding a preset limit.

* * * * *

UNITED STATES PATENT AND TRADEMARK OFFICE
CERTIFICATE OF CORRECTION

PATENT NO. : 4,683,529
DATED : July 28, 1987
INVENTOR(S) : James D. Bucher, II

It is certified that error appears in the above-identified patent and that said Letters Patent is hereby corrected as shown below:

Column 18, claim 1, lines 63-64, "voltage capacitor" should read -- capacitor means --;

Claim 1, lines 65-66, "voltage storage means" should read -- capacitor means --;

Claim 1, line 68, "voltage storage means" should read -- capacitor means --.

Column 19, claim 6, lines 48-49, "voltage storage means" should read -- capacitor means --;

Claims 7, line 56, "voltage storage means" should read -- capacitor means --;

Claim 8, line 62, after the word "current" insert -- with a rectifier --.

Column 21, claim 10, line 6, after the phrase "storage capacitor" insert -- means --;

UNITED STATES PATENT AND TRADEMARK OFFICE
CERTIFICATE OF CORRECTION

PATENT NO. : 4,683,529
DATED : July 28, 1987
INVENTOR(S) : James D. Bucher, II

It is certified that error appears in the above-identified patent and that said Letters Patent is hereby corrected as shown below:

Claim 10, line 9, after the phrase "storage capacitor" insert -- means --;

Claim 10, line 16, after the phrase "storage capacitor" insert -- means --.

Signed and Sealed this

Twelfth Day of April, 1988

Attest:

DONALD J. QUIGG

Attesting Officer

Commissioner of Patents and Trademarks